United States Patent
Takizawa (10) Patent No.: US 7,342,609 B2
(45) Date of Patent: Mar. 11, 2008

(54) EXPOSURE ADJUSTMENT IN AN IMAGING APPARATUS

(75) Inventor: Junichi Takizawa, Urawa (JP)

(73) Assignee: Eastman Kodak Company, Rochester, NY (US)

( * ) Notice: Subject to any disclaimer, the term of this patent is extended or adjusted under 35 U.S.C. 154(b) by 708 days.

(21) Appl. No.: 10/945,067

(22) Filed: Sep. 20, 2004

(65) Prior Publication Data

US 2005/0030415 A1 Feb. 10, 2005

Related U.S. Application Data

(63) Continuation of application No. 09/567,332, filed on May 9, 2000, now abandoned.

(51) Int. Cl.
*G03B 7/00* (2006.01)
*H04N 5/235* (2006.01)

(52) U.S. Cl. .................................. 348/362
(58) Field of Classification Search ............... 348/365, 348/169, 229.1, 221.1, 362, 364; 358/520; 396/233, 234, 268
See application file for complete search history.

(56) References Cited

U.S. PATENT DOCUMENTS

| | | | |
|---|---|---|---|
| 5,128,769 A | 7/1992 | Arai et al. | |
| 5,319,416 A | 6/1994 | Takagi | |
| 5,347,371 A | 9/1994 | Nishimura et al. | |
| 5,353,058 A * | 10/1994 | Takei | 348/362 |
| 5,414,487 A | 5/1995 | Iwasaki | |
| 5,510,837 A * | 4/1996 | Takei | 348/362 |
| 5,541,654 A | 7/1996 | Roberts | |
| 5,808,681 A * | 9/1998 | Kitajima | 348/371 |
| 5,831,676 A * | 11/1998 | Takahashi et al. | 348/362 |
| 5,880,782 A | 3/1999 | Koyanagi et al. | |
| 5,929,908 A | 7/1999 | Takahashi et al. | |
| 6,373,981 B1 * | 4/2002 | de Queiroz et al. | 358/464 |
| 6,978,045 B1 * | 12/2005 | Hashimoto et al. | 382/199 |
| 7,010,160 B1 * | 3/2006 | Yoshida | 348/362 |

FOREIGN PATENT DOCUMENTS

JP 7-26874 1/1995

* cited by examiner

*Primary Examiner*—Lin Ye
*Assistant Examiner*—Jason Whipkey
(74) *Attorney, Agent, or Firm*—Pamela R. Crocker (57) ABSTRACT

An imaging apparatus for performing exposure adjustment based on the luminance of screen images through photo-electric conversion includes a structure for providing a signal to be applied to a screen for viewing images, a structure defining a region satisfying a predetermined condition based on where the luminance is excluded from a base region predetermined in the screen signal, and a structure for automatically providing exposure adjustment on the signal based on the luminance of a remaining region in the base region.

5 Claims, 10 Drawing Sheets

EXPOSURE ADJUSTMENT IN AN IMAGING APPARATUS

This application is a continuation of U.S. application Ser. No. 09/567,332, filed May 9, 2000, now abandoned.

BACKGROUND OF THE INVENTION

1. Field of the Invention

The present invention relates to an imaging apparatus provided with an automatic exposure adjusting function for automatically adjusting exposure when photographing an image through photoelectric conversion, for example, a digital still camera, a digital moving image photographing apparatus, or the like.

2. Description of the Related Art

Recently, along with progress of miniaturization and higher performance of a CCD device, an imaging apparatus through photoelectric conversion with the CCD device mounted thereon is increasingly utilized. As a method for automatic exposure adjustment in an imaging apparatus of this type, a method is disclosed in Japanese Patent Publication No. Hei 7-26874 for performing exposure adjustment by using a CCD device as an imaging structure for photometric exposure adjustment. According to this method, photometry is possible using information of an image per se to be imaged, and therefore exposure adjustment can be performed more accurately than a case when a photometric mechanism is separately provided, which is an advantage.

However, in a conventional imaging apparatus for performing automatic exposure adjustment, the exposure adjustment has always been performed based on image information of an imaging screen as a whole, and therefore there is a problem that the exposure adjustment cannot always be accurately performed relative to a main subject photographed, when contrast in an imaging screen is large, such as a case when the imaging screen includes a light source such as the sun or the like.

SUMMARY OF THE INVENTION

It is an object of this invention to provide improved automatic adjustment of an imaging apparatus. This object is achieved by an imaging apparatus for performing exposure adjustment based on the luminance of screen images through photoelectric conversion, comprising:

a) means for providing a signal to be applied to a screen for viewing images;

b) means defining a screen region satisfying a predetermined condition based on where the luminance is excluded from a base region predetermined in the screen signal; and c) means for automatically providing exposure adjustment on the signal based on the luminance of a remaining region in said base region.

To solve the above-described problem, an imaging apparatus for automatic exposure adjustment according to the present invention excludes a region satisfying a predetermined condition based on the luminance from a base region predetermined in a screen and performs exposure adjustment based on the luminance of a remaining region, so that influence of the luminance of images other than a main subject photographed on the exposure adjustment can be reduced, and thus accuracy in the exposure adjustment relative to the main subject photographed can be improved.

In addition, since the imaging apparatus for automatic exposure adjustment according to the present invention detects a contour of an image in a screen and performs exposure adjustment based on the luminance of the contour, influence of the luminance of images other than the main subject photographed on the exposure adjustment can be reduced, and accuracy of exposure adjustment relative to the main subject photographed can be improved.

DESCRIPTION OF THE PREFERRED EMBODIMENTS

Now, description is given about a first embodiment where an imaging apparatus according to the present invention is applied to a digital still camera. Schematic configuration of the present embodiment is described with reference to FIG. 1.

Figure 1:
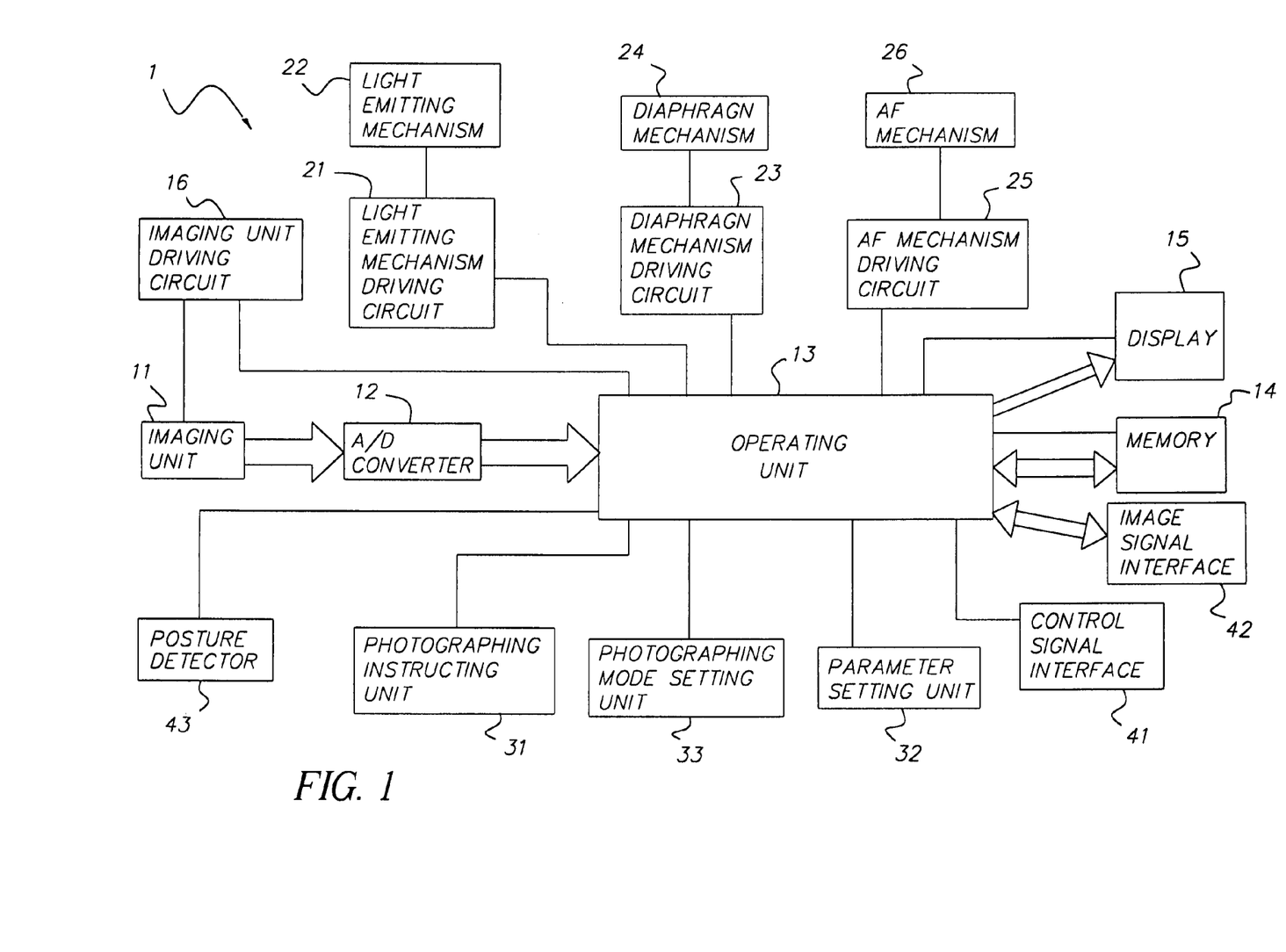
FIG. 1 is a block diagram of a schematic configuration of a digital still camera according to an embodiment of the present invention.

A digital still camera 1 comprises an imaging unit 11, for example, a CCD device, for capturing an image as a signal through photoelectric conversion, an A/D converter 12 for A/D converting the image signal from the imaging unit 11, an operating unit 13, for example CPU, for processing various operations on the A/D converted signals, for example, operations in the exposure adjusting step or the like, a memory 14 for memorizing and storing various parameters of imaged image signals and operational processing, and an imaging unit driving circuit 16, for example a CCD driving circuit, connected to the operating unit 13 for driving and controlling the imaging unit 11. The image signal taken in the memory 14 is displayed on a display 15, for example, a liquid crystal display, connected to the operating unit 13 and incorporated in the digital still camera 1, or an external display not shown, for example, a CRT or the like, connected through an image signal interface 42.

The digital still camera 1 further comprises a light emitting mechanism 22 externally connected to or incorporated in the camera, a light emitting mechanism driving circuit 21 for driving, for example, a stroboscope, a diaphragm mechanism 24 for movably setting a diaphragm, a diaphragm mechanism driving circuit 23 for driving the diaphragm mechanism 24, an automatic focusing mechanism (hereinafter referred to as AF mechanism) 26, and an AF mechanism driving circuit 25 for driving the AF mechanism 26. These driving circuits are respectively connected to the operating unit 13 to be controlled thereby.

Furthermore, the digital still camera 1 comprises a photographing instructing unit 31 for inputting a photographing instructing manipulation, for example, a release button, a parameter setting unit 32 for setting/modifying various parameters relative to operations in the operating unit 13, a photographing mode setting unit 33 stored in the memory 14 for selectively operating operational processing patterns set in accordance with photographing circumstances, and a control signal interface 41 for exchanging various parameters with an external controller of the operating unit or the outside.

Now, photographing procedure of an image in the present embodiment is described with reference to FIG. 2. Firstly, photographing modes are set at the photographing mode setting unit 33 (photographing mode setting step S11). The photographing modes include, for example, a landscape picture mode, a personal picture mode, a night view mode, and the like, and in correspondence with these respective modes, various parameters to be used in an operational processing are respectively stored in the memory 14. By this setting, various parameters corresponding to the photographing mode being set can be called by the operating unit 13.

Then, when a photographing preparation instruction is issued (for example, a release button is half-pressed) at the photographing instructing unit 31 (photographing preparation instructing step S12), focusing is performed by the AF mechanism 26 (focusing step S13). Then, when a photographing instruction is issued (for example, the release button is fully pressed) at the photographing instructing unit 31 (photographing instructing step S14), firstly preliminary photographing is performed, and based on the imaged screen taken by the preliminary photographing, exposure adjustment is performed (exposure adjusting step S15), followed by main photographing of an image (image photographing step S16).

Now, procedure of the exposure adjusting step S15 in the present embodiment is described with reference to FIG. 3. It should be noted that an imaged screen in the description of the present step indicates an imaged screen taken by the preliminary photographing.

Firstly, the luminance E of a base region predetermined in an imaged screen (for example, the average luminance of an imaged screen as a whole) is calculated (base region luminance calculating step S21). FIG. 4 shows an example of partitioned blocks of a base region. In this step, a base region 50 is partitioned into a plurality of regions (for example, blocks 51 of crosswise 12, longitudinal 8 (=96)), and the block luminance of each blocks 51, for example, the average luminance L (i, j) (i=1, 2, . . . , 12, j=1, 2, . . . , 8) of pixels in each blocks is calculated (block luminance calculating step S22). Then, the logarithm-transformed and normalized block luminance L' (i, j), which is the block luminance L (i, j) normalized and transformed into a logarithm is calculated (step of normalizing and transforming into logarithm of the block luminance: step S23). Here, as shown in the following equation, the luminance is normalized so that the previously calculated base region luminance E corresponds to the standardized luminance (for example, 18% reflectance luminance X18), and transformed into a logarithm so as to have 2 as the base.

$$L'(i,j)=\log 2(L(i,j) \times X18/E)$$

With the block luminance being normalized or transformed into logarithm in this way, imaged screens of any luminance distribution can be processed at the unified luminance level, and thus processing accuracy in exposure adjustment can be improved.

Unneeded image regions except for the main subject photographed are then estimated based on the luminance, and the regions are excluded (unneeded region excluding step S24). In this step, an unneeded image region of the high luminance or the low luminance such as a light source, for example, the sun, or a locally dark portion such as a dark suit, or the like, is estimated, and excluded from an object to be calculated of an modifying index to be used as a base of calculating an exposure adjusting index, namely a remaining region. The remaining region is discriminated by setting a remaining region index FL. The base region 50 is first given FL=1, and when discriminating a region to be excluded, its remaining region index FL is replaced with FL=0 on demand. When estimating an unneeded region, the luminance is weighted depending on positions in a screen, so that an image element which is highly likely to be the main subject photographed is rarely excluded. This step is further described in detail. An unneeded region with the high luminance is excluded by applying the remaining region index FL=0 to a block where a value obtained by multiplying the luminance with the position dependent weighting index WPu which is low at the center of a screen and increases toward a periphery of the screen is more than a predetermined threshold Tu. On the other hand, an unneeded region with the low luminance is excluded by applying the remaining region index FL=0 to a block where a value obtained by multiplying the luminance with the position dependent weighting index WPd which is high at the center of a screen and decreases toward a periphery of the screen is less than a predetermined threshold Td. In other words, estimation of an unneeded region in this step is performed by excluding a region which satisfies a predetermined condition based on the luminance. By estimating, in this way, a region of an image which is not the main subject photographed depending on the luminance to exclude that region from an object to be calculated of the exposure adjusting index, accuracy in exposure adjustment relative to the main subject photographed can be improved. Further, by weighting at the time depending on positions, an image other than the main subject photographed can be more accurately estimated and excluded.

The modifying index based on the luminance of a remaining region is then calculated (modifying index calculating step S25). Firstly, the following steps are bifurcated by discriminating the appropriate procedure to calculate the modifying index, based on a ratio of a region still remaining after exclusion of the unneeded regions relative to the predetermined region in an imaged screen (modifying index calculating procedure discriminating step S26). When the ratio is large, the luminance of the remaining region is calculated as the modifying index (remaining region luminance calculating step S27). More particularly, when the number of blocks in the remaining region at the time ZB (namely, the number of blocks of which remaining region indices are other than 0) is larger than the threshold Tb, the modifying index M is calculated as a weighted average (remaining region luminance) Ma which is, as indicated by an equation shown below, the logarithm-transformed and normalized luminance L' of the remaining region weighted depending on positions and weighted depending on the brightness in the screen. It should be noted that the threshold Tb is set, for example, at Tb=31 for the number of blocks of the base region (=96).

$$Ma = f°(Lk' \times WPk \times WLk)/f°(WPk \times WLk)$$

Figure 4:
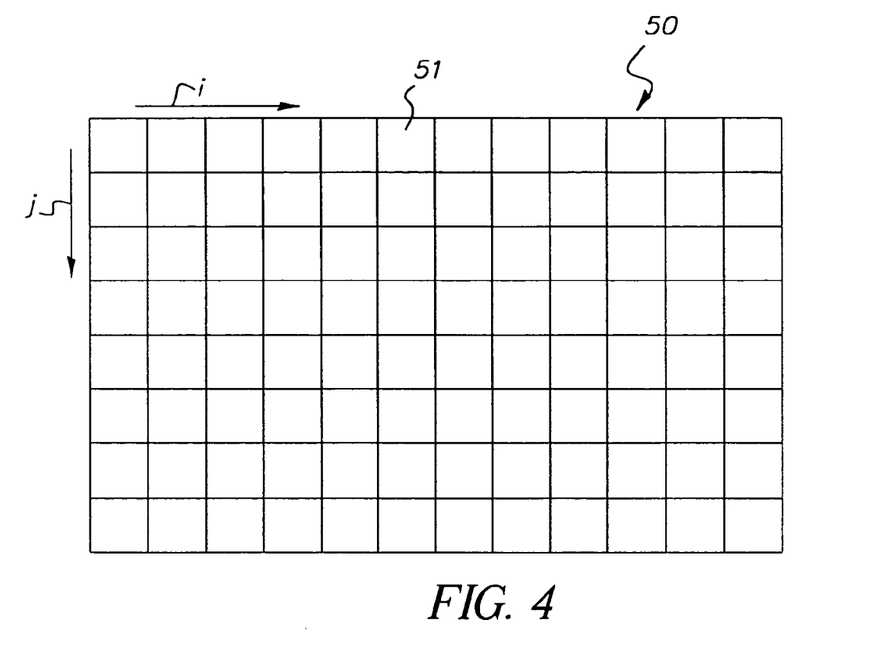
FIG. 4 shows an example of partitioned blocks in a base region set in an imaged screen by a digital still camera according to the present invention.
Figure 5:
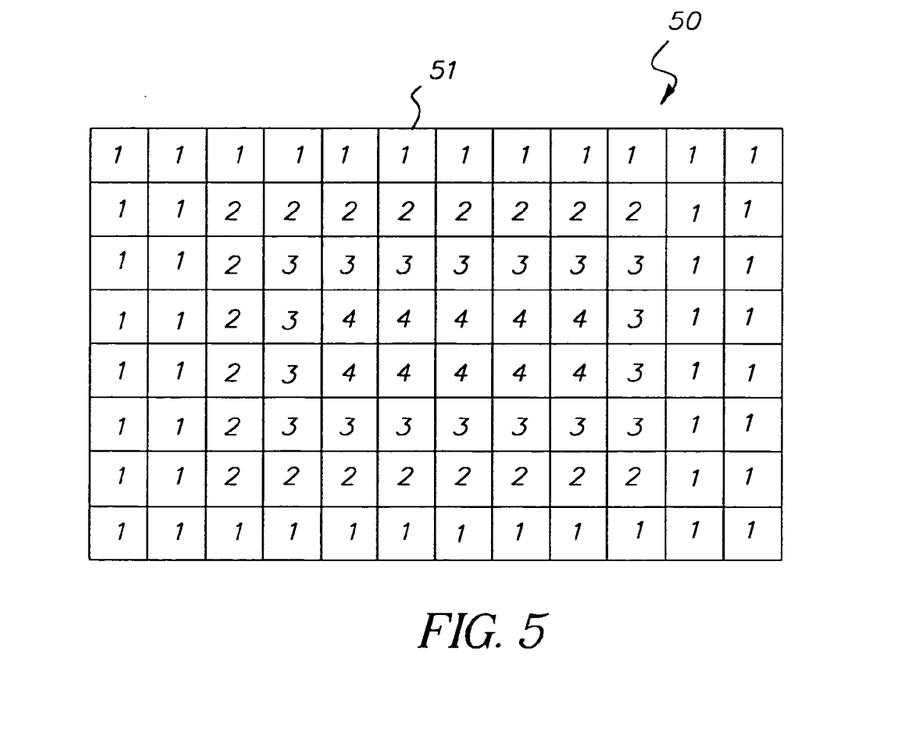
FIG. 5 shows an example of position dependent weighting coefficients of an imaged screen set for a digital still camera according to the present invention.
Figure 6:
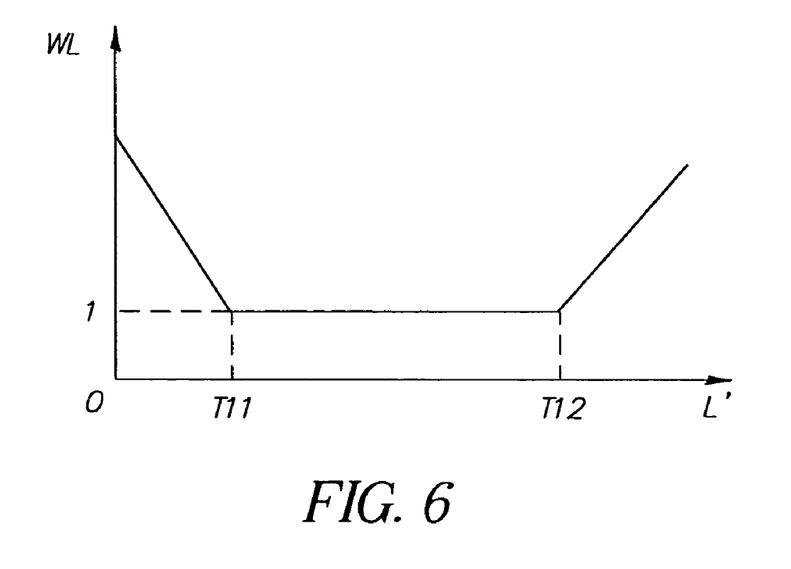
FIG. 6 shows an example of weighting coefficients depending on the luminance of an imaged screen set for a digital still camera according to the present invention.

Here, k's (=1, 2, . . . , ZB) are numbers allocated to each block having a remaining region index FL other than 0, WP's are position dependent weighting coefficients, and WL's are brightness dependent weighting coefficients. Position dependent weighting coefficients WP are established such that the value at the center of a screen is the maximum and the values of other points are established to become smaller radially toward the periphery. FIG. 5 shows an example of position dependent weighting coefficients WP established for each partitioned block 51 of the base region 50. Respective numerals shown in frames of the blocks 51 represent the position dependent weighting coefficients WP of the respective blocks. The main subject photographed is likely to be near the center of a screen, and therefore by more heavily weighting the vicinity of the center of the screen, accuracy of exposure adjustment relative to the main subject photographed can be improved. FIG. 6 shows an example of brightness dependent weighting coefficients WL established depending on the luminance. In the example, it is established so that, in a region where the luminance L' is lower than a first threshold T11, a coefficient WL is higher with lowering luminance L', in a region where the luminance L' is higher than a second threshold T12, a coefficient WL is higher with increasing luminance L', and when the luminance is between the first threshold T11 and the second threshold T12, a coefficient WL is 1, and the coefficients WL are continuous within the ranges. An imaging unit 11 of a CCD device or the like generally has a limited range of luminance for receiving the light, and when the luminance of an imaged image exceeds this range, the luminance is saturated and recognized as lower than it actually is. Accordingly, by setting a threshold depending on a light receiving range of an imaging unit in this way, and by correcting the luminance within the high luminance range and the low luminance range, it is possible to obtain a luminance distribution nearer to the actual state, and thus accuracy in exposure adjustment relative to the main subject photographed can be further improved.

In contrast, when a ratio of the remaining region relative to the predetermined region in an imaged screen is small, the modified base region luminance is calculated, as a modifying index, by heavily weighting the remaining region based on the luminance of the base region (modified base region luminance calculating step S28). More particularly, the modifying index M is calculated as a weighted average (modified base region luminance Mb), which is obtained, as indicated by an equation shown below, by weighting depending on positions and by weighting depending on the brightness in the base region, and by heavily weighting a region still remaining at that time. The equation is:

$$Mb = f°(L'(i,j) \times WP(i,j) \times WL(i,j) \times WM(i,j)/f°(WP(i,j) \times WL(i,j) \times WM(i,j))$$

Here, WP's are position dependent weighting coefficients, and WL's are brightness dependent weighting coefficients, and coefficients, for example, similar to those described in the previous step S27 are used. Further, WM is also a weighting coefficient based on the remaining region index FL. The weighting coefficient WM based on the remaining region index FL is established, for example, at 2 in blocks where the remaining region index FL is other than 0, and at 1 in blocks where the remaining region index FL is 0. When a ratio of a remaining region relative to the base region is small, it is more likely that a portion other than the remaining region is also photographed as the main subject photographed. Accordingly, in such a case, the modifying index to be used as the base of exposure adjustment is calculated not only from the luminance of the remaining region but also based on the luminance of the whole of the base region after the remaining region is weighted, and thus the exposure adjustment relative to the main subject photographed can be more exactly performed.

Now, an exposure adjusting index to be used as the base for the exposure adjustment is calculated (exposure adjusting index calculating step S29). The exposure adjusting index A is calculated based on the base region luminance E corresponding to a ratio of the initial region used as the base when calculating the modifying index M relative to the base region and the modifying index M. More particularly, the exposure adjusting index A is calculated by the following equations:

$$A = (1-f\ddot{O}) \times E' + f\ddot{O} \times M'$$

$$E' = \log 2E$$

$$M' = M - \log 2(X18/E)$$

Figure 7:
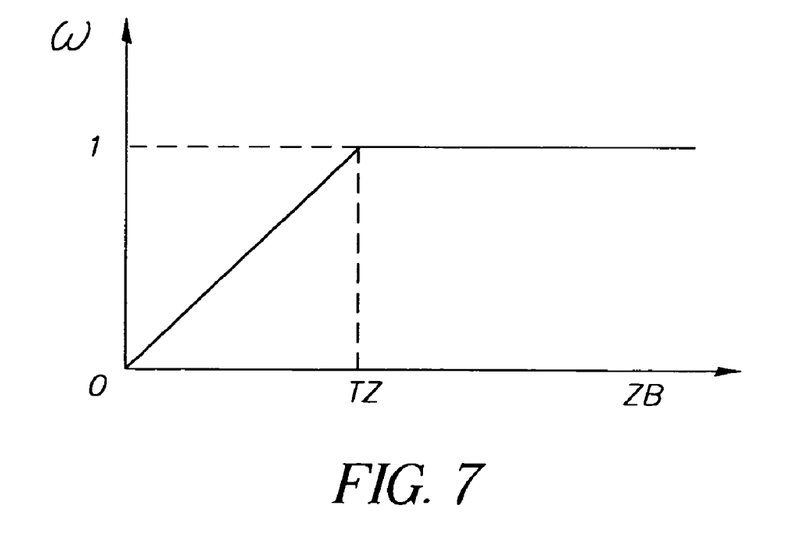
FIG. 7 shows an example of weighting coefficients related to calculating exposure adjusting index set for a digital still camera according to the present invention.

Here, fÖ is a weighting coefficient corresponding to a ratio of the initial region used as the base when calculating the modifying index M relative to the base region, and it is established so that, for example as shown in FIG. 7, when the number of blocks ZB in the remaining region in the unneeded region excluding step S24 is 0, the coefficient fÖ is 0, when the number ZB is more than the threshold Tz, the coefficient fÖ is 1, when the number ZB is between 0 and the threshold Tz, the coefficient fÖ linearly varies between 0 and 1, and values of the coefficient fÖ are continuous within these ranges. It should be noted here that a threshold Tz is established, for example, at Tz=75 relative to the number of blocks in the base region (=96). Further, in order to calculate the exposure adjusting index A here as a weighted average, a value E' obtained by transforming the base region luminance E into a logarithm, and a value M' obtained by releasing the modifying index M from the above-described normalization are used. As understood from the equations, when the number of blocks ZB in the remaining region is larger, a ratio of the modifying index (M') in the exposure adjusting index A is larger, and when the number of blocks ZB in the remaining region is larger than the threshold Tz, the modifying index (M') per se becomes the exposure adjusting index A. When a ratio of the initial region used as the base for calculating the modifying index relative to the base region is small, it is more likely that a portion excepting the initial region used as the base for calculating the modifying index is also photographed as the main subject photographed. Accordingly, by setting so that weight of the modifying index M in the exposure adjusting index A is increased, namely contribution of the modifying index M in the exposure adjustment is raised, when a ratio of the initial region used as the base for calculating the modifying index M relative to the base region is higher, accuracy in exposure adjustment relative to the main subject photographed can be improved.

Exposure is controlled based on the exposure adjusting index A (exposure control step S30). Exposure control in this step is performed relative to the diaphragm driving circuit 23, the imaging unit driving circuit 16, the light emitting mechanism driving circuit 21, or the like. More particularly, when a exposure adjusting index A is on a lower side, namely in the case of underexposure, mechanisms are controlled depending on the exposure adjusting index A, so as to have a higher diaphragm aperture, to elongate an imaging period or a light receiving period at an imaging unit driving circuit, or to activate a light emitting mechanism to emit light. In contrast, when the exposure adjusting index A is on a higher side, the mechanisms are controlled in the opposite way. These mechanisms can also be selectively controlled depending on setting of a photographing mode or other various parameters, or the like.

Figure 8:
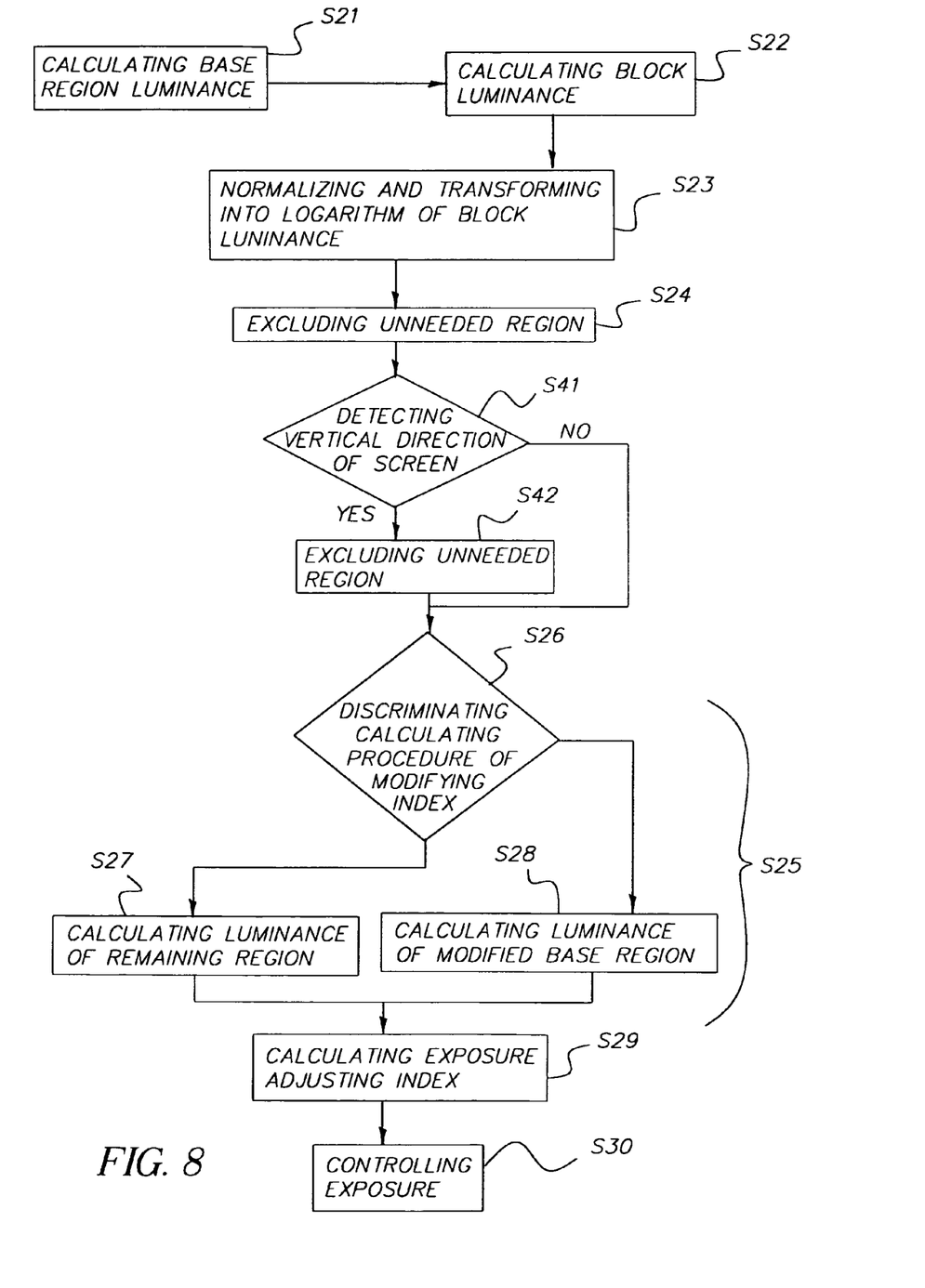
FIG. 8 is a flow chart illustrating an exposure adjusting step for a digital still camera according to a second embodiment of the present invention.

A second embodiment where the present invention is applied to a digital still camera will now be described. In a procedure of an exposure adjusting step, the present embodiment is provided with a second excluding step for an unneeded region after the excluding step for the unneeded region in the first embodiment. Further, in the present embodiment, the schematic configuration of the apparatus and processing procedure except for an exposure adjusting step are the same as the first embodiment described above. Here, an exposure adjusting step S15 is exclusively described. FIG. 8 shows a flow chart of the exposure adjusting step S15 of the present embodiment.

Figure 9A:
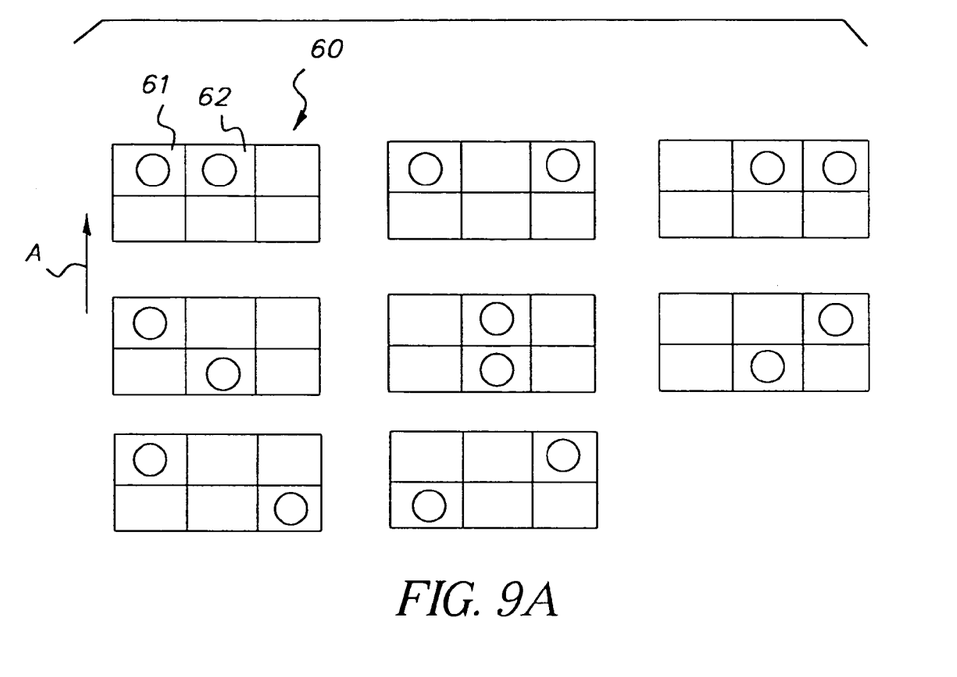
FIGS. 9A, 9B, and 9C show examples of direction detecting maps set for a digital still camera according to a second embodiment of the present invention.
Figure 9B:
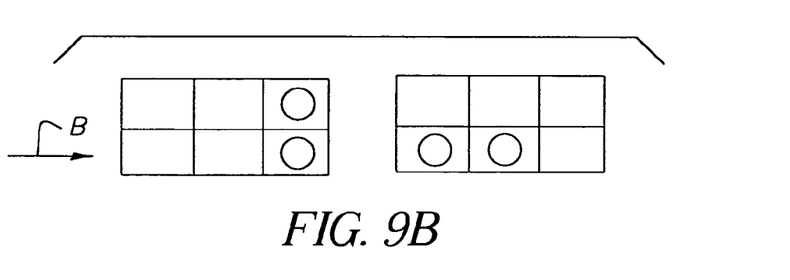
Figure 9C:
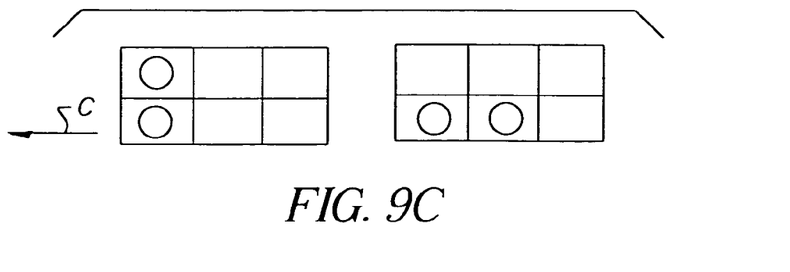

Prior to a second unneeded region excluding step S42, a step S41 for vertically detecting a screen is previously performed based on the luminance distribution of an imaged screen. In the step S41, an area predetermined in the imaged screen is partitioned into a plurality of regions, and a direction of a screen is determined based on an arrangement of regions having larger luminance. An example is described with reference to FIG. 9. FIG. 9 are examples of direction detecting maps to be used as bases in direction detecting of screens. A base region predetermined in an imaged screen is partitioned into large blocks of 2 longitudinal×3 crosswise, an arrangement of a large block having the largest luminance and a large block having the second largest luminance is recognized, arrangements of these two large blocks (61, and 62) in a direction detecting map 60 called from the memory 14 are compared, and the direction of the screen is thus determined. Here, when arrangements of large blocks in imaged screens fall on FIGS. 9A, 9B, or 9C respectively, a direction indicated by an arrow A, B, or C in the Figs. is respectively determined as the upper direction of the respective imaged screens.

Then, when a direction can be detected in the step 41, a region not being the main subject photographed is further estimated based on the luminance and the direction of the imaged screen and the step is bifurcated into a second unneeded region excluding step S42 to be excluded from the remaining region, and when a direction cannot be detected, the step is bifurcated into a modifying index calculating step S25.

In the second excluding step S42, the sky or a shadow, for example, can be excluded from a remaining region. In other words, a region of high luminance at an upper portion of an imaged screen is detected as the sky, while a region of low luminance at a lower portion of an imaged screen is detected as a shadow, and these are excluded. More particularly, a block where a value obtained by multiplying the luminance with a weighting coefficient WP1 which increases from a low direction toward an upper direction in an imaged screen is larger than the threshold Tsk, is recognized as a block of the sky, while a block where the value is smaller than the threshold is recognized as a block of a shadow. Since the sky or a shadow can be excluded in this way based on a direction and the luminance detected from a screen, exposure adjustment relative to the main subject photographed can be performed with high accuracy. It should be noted that this step S42 is set such that, for example, by setting the above-described thresholds Tsk and Tsd, a region with the luminance lower than that of the excluded region in the above-described excluding step S24 is made to be excluded when excluding a brighter region, and a region with luminance higher than that of the excluded region in the above-described excluding step S24 is made to be excluded when excluding a darker region. Since an unneeded region is excluded paying consideration to a vertical direction of an imaged screen in the step S42, a region where luminance level is nearer to the luminance of the main subject photographed can be excluded with high accuracy, and accuracy in the exposure adjustment can be improved.

Figure 10:
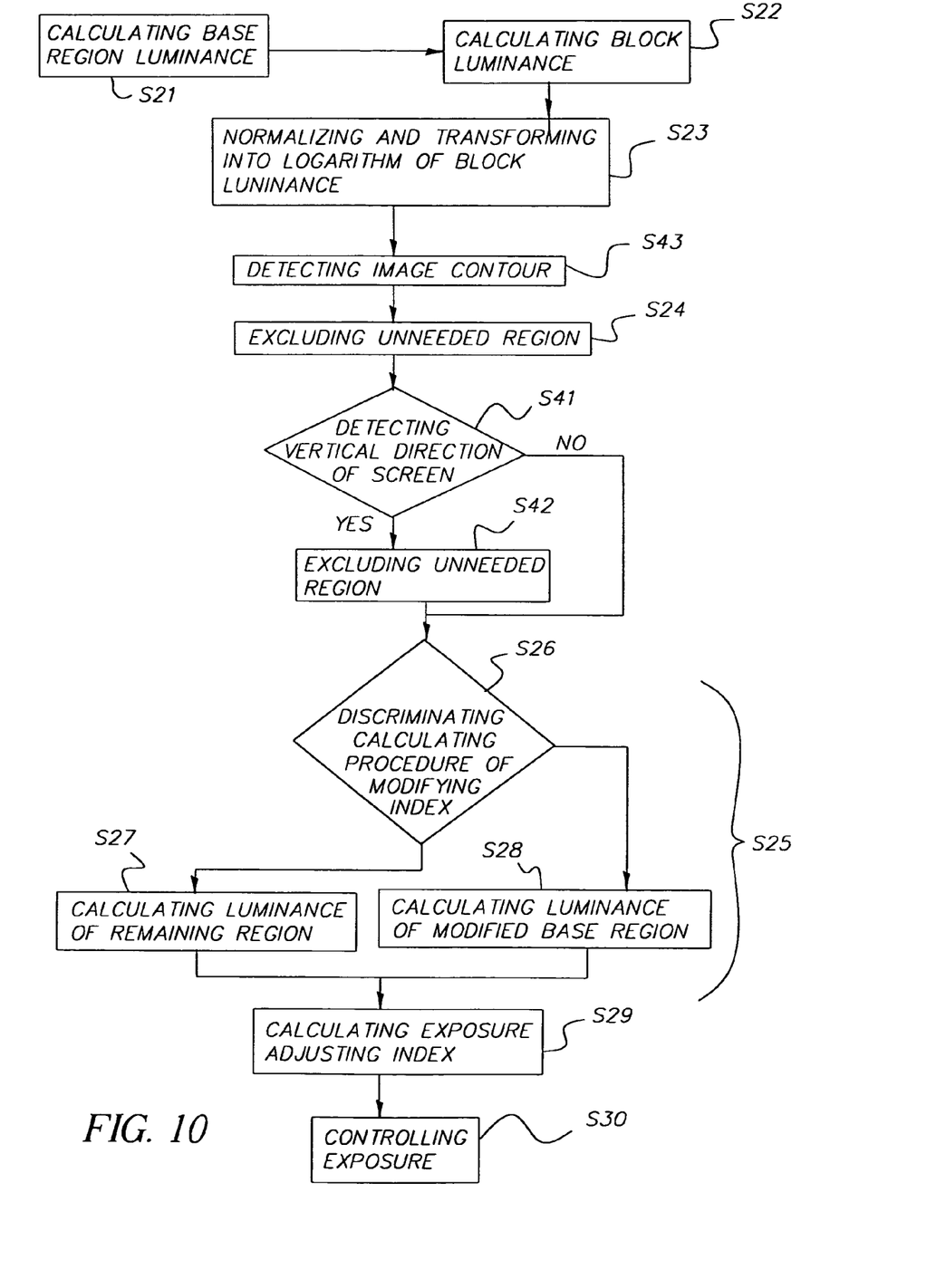
FIG. 10 is a flow chart illustrating an exposure adjusting step for a digital still camera according to a third embodiment of the present invention.

Now, a third embodiment in which the present invention is applied to a digital still camera is described. In this embodiment, a contour of an image of an imaged screen is detected, and based on the luminance detected of the contour, exposure adjustment is performed. It should be noted that, in this embodiment, the schematic configuration of an apparatus and steps except for an exposure adjusting step are the same as the first embodiment described above. Therefore, the exposure adjusting step is exclusively described hereinafter. FIG. 10 is a flow chart of the exposure adjusting step S15 in the present embodiment.

The exposure adjusting step S15 is, following a base region luminance calculating step S21, a block luminance calculating step S22, and a step for normalizing and transforming into a logarithm of the block luminance S23, similar to the first embodiment, provided with a step S43 for detecting a contour of an image of an imaged screen. In this step S43, a region of a contour, for example, blocks of a contour, is recognized based on the luminance. More particularly, as indicated by the following equation, blocks of which the absolute value of a rate of change of the luminance in the blocks (for example, difference in the luminance between a specific block and a block neighboring the specific block) is larger than the contour threshold Th1 are recognized as blocks of the contour. The equation is;

$DB(i,j) \mathrm{E} Th1$ or $DS(i,j) \mathrm{E} Th1$

Figure 11A:
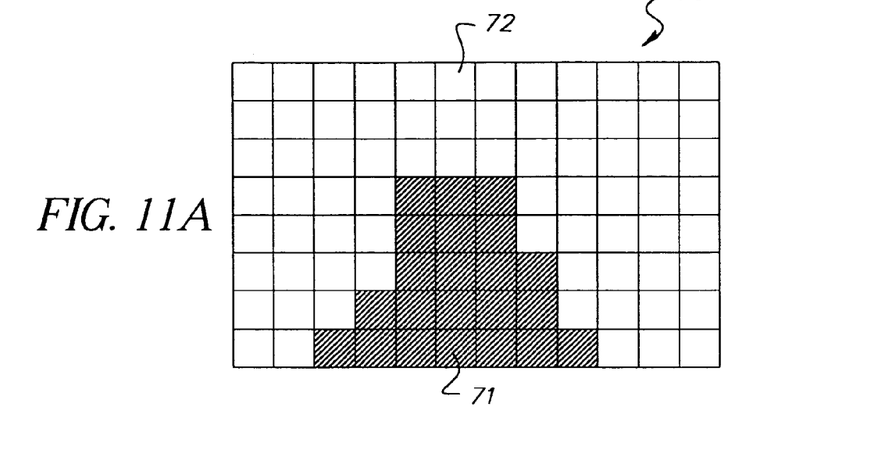
FIGS. 11A, 11B, and 11C are schematic diagrams describing a contour detecting step and an unneeded region excluding step based on the luminance and a vertical direction of an imaged screen for a digital still camera according to a third embodiment of the present invention.
Figure 11B:
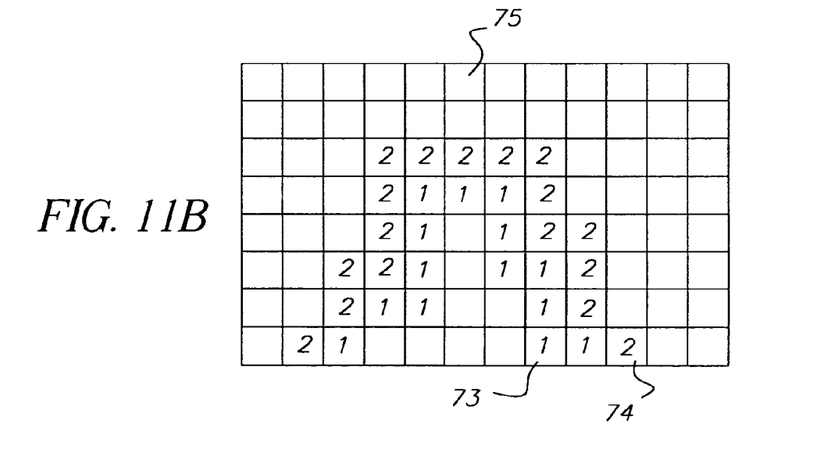

Here, $DB(i,j)$ and $DS(i,j)$ ($i=1, 2, \ldots, 12, j=1, 2, \ldots, 8$) are respectively the maximum of the luminance increase rate and the maximum of the luminance decrease rate in the respective blocks i, and these are respectively;

$DB(i,j) = |\max AL - L'(i,j)|$ $DS(i,j) = |\min AL - L'(i,j)|$ $\max AL = \max(L'(i+1,j+1), L'(i+1,j), L'(i+1,j-1), L'(i-1,j+1), L'(i-1,j), L'(i-1,j-1))$ $\min AL = \min(L'(i+1,j+1), L'(i+1,j), L'(i+1,j-1), L'(i-1,j+1), L'(i-1,j), L'(i-1,j-1))$ Remaining region indices FL are determined depending on values of the DB and the DS. The remaining region indices FL are established for respective blocks, at FL=1 for contour blocks where DB>DS, at FL=2 for contour blocks where DB<DS, and at FL=0 for other blocks. In other words, here, the remaining region where an unneeded image is estimated and excluded from the base region is recognizably established as a region having the remaining region index FL at other than 0, and a contour appearing at a border of a bright image region having the high luminance and a dark image region having the low luminance is established so that a contour in a bright region (the remaining region index FL=2) and a contour in a dark region (the remaining region index FL=1) are recognizable by the remaining region index. FIG. 11 schematically show an example of detecting a contour. In a base region 70 of an imaged screen shown in FIG. 11A, there are blocks 71 which are assumed to be an image region of the main subject photographed and blocks 72 which are assumed to be the sky. In FIG. 11B, a contour is detected relative to the imaged screen. In FIG. 11B, numerals in frames of blocks are the remaining region indices FL. However, regions where the remaining region index FL is 0 are blank.

In this step, a contour region of an image is used as a remaining region. As this use enables reduction of the influence on exposure adjustment of the luminance distribution unrelated with the main subject photographed in an unneeded region by limiting the unneeded region other than the main subject photographed exclusively to a contour, accuracy in exposure adjustment relative to the main subject photographed can be improved. As this also enables a reduction of the area or the number of regions subjected to calculation of the exposure adjusting index, exposure adjustment can be rapidly performed.

An image region other than the main subject photographed is estimated and excluded from the remaining region based on the luminance (unneeded region excluding step S24), a screen is then vertically detected based on the luminance distribution of an imaged screen, and based on a detected result of the direction of a screen, the step is bifurcated (screen vertical direction detecting step S41). Except for having the remaining region as a region for a contour, these steps are similar to the first or the second embodiment, and therefore achieve similar operation and advantage.

Figure 11C:
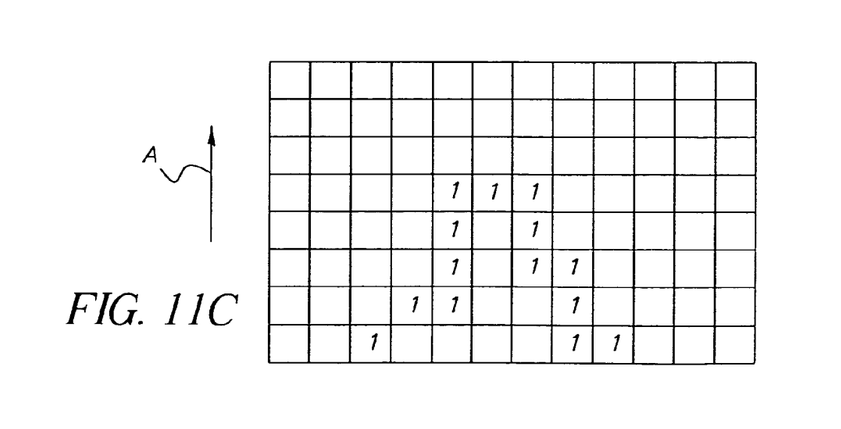

Further, in the second excluding step S42, similar to the second embodiment, the sky or a shadow, for example, can be excluded from the remaining region. Firstly, a block located at the uppermost based on the direction detected in the previous step and the luminance thereof being higher than the threshold Tsk is recognized as a block of the sky. Further, all blocks in the same column as the block, and located further up than the uppermost block having the remaining region index at 1, and having the remaining region index at 2 (namely a contour on a bright side) are recognized as blocks of the sky, and the remaining region indices of all these blocks are replaced by 0. Also, in a case where the above-described column has no block having the remaining region index FL at 1, blocks having the remaining region index FL at 2 are recognized as blocks of the sky, and the remaining region indices FL of all these blocks are replaced by 0. For example, if this step is implemented in the example described with FIG. 11B where a contour is detected, it comes out as shown in FIG. 11C (a direction indicated by an arrow A is the upper direction in the screen screen). Numerals and blanks in FIG. 11C represent the remaining region indices FL similarly with FIG. 11B. On the other hand, a block located at the lowest point based on a direction detected in the previous step and the luminance being lower than the threshold Tsd is recognized as a block of a shadow. Further, all blocks in the same column as the block, and located further down than the lowest block having the remaining region index FL at 2, and having the remaining region index FL at 1 (namely, a contour on a dark side) are recognized as blocks of the shadow, and the remaining region indices FL of all these blocks are replaced by 0. Further, in a case where the above-described column also has no block with the remaining region index FL at 2, blocks having the remaining region index FL at 1 are recognized as blocks of the sky, and the remaining region indices of these blocks are all replaced by 0. By separating and recognizing a bright region from a dark region of a contour in this way, the sky or the shadow can be easily excluded with high accuracy, and thus accuracy in exposure adjustment relative to the main subject photographed can be improved. In addition, if the second excluding step S42 is implemented in a state where a light source, for example, the sun, still remains, it is conceivable that a region of a contour of the light source may be mistakenly recognized as a region of a contour of the sky, and, as in the present embodiment, by previously excluding a light source, a dark region, or the like by implementing the unneeded region excluding step S24 not depending on a vertical direction of a screen prior to the present step, erroneous recognition of an excluding region in the step S42 can be prevented, thus realizing exposure adjustment with higher accuracy.

Steps to follow the second unneeded region excluding step S42 (S25, S26, S27, S28, S29, and S30) are similar to the above-described first or second embodiment, and operation and advantage of these steps are also similar to the first or the second embodiment.

It should be noted that in the present embodiment the weighting coefficient fÖ in the exposure adjusting index calculating step S29 may be established in correspondence with a ratio of a region of a contour recognized in the contour detecting step S43 relative to the base region (for example, a ratio of the number of blocks of contour detected in the contour detecting step relative to the number of blocks in the base region). In this case, in FIG. 7, the abscissa is changed from the number of blocks in the remaining region ZB to the number of blocks of the contour ZE, and the threshold Tz is established, for example, at Tz=21 relative to the number of blocks in the base region (=96).

It should be noted that the present invention is also applicable to a moving image photographing apparatus. In this case, exposure adjustment according to the present invention is implemented as required while photographing the moving image. In addition, the sequence of implementing the respective steps can be altered. For example, the first and the second excluding steps may be performed following the direction detecting step relative to an imaged screen. Further, although various calculations for the exposure adjustment are performed relative to the partitioned blocks of the base region, the calculations may be performed relative to pixels. Further, respective thresholds may be established for each photographing mode. In this way, exposure adjustment can be optimized for a variety of photographing situations. Furthermore, a posture detector 43 (FIG. 1) for detecting a relative posture relative to the vertical direction of an imaging apparatus may be provided, so that a screen can also be vertically detected.

Further, prior to the exposure adjusting step, white balance gain adjustment may be performed by a known method based on the luminance of an image preliminarily photographed by an imaging unit 11. The white balance gain adjustment is to adjust respective gains of the luminance of the primaries in correspondence with, for example, photographing modes, and therefore the luminance distribution in a form nearer to the luminance distribution of an actual image can be made reproducible, and thus accuracy in exposure adjustment can be further improved.

Figure 12:
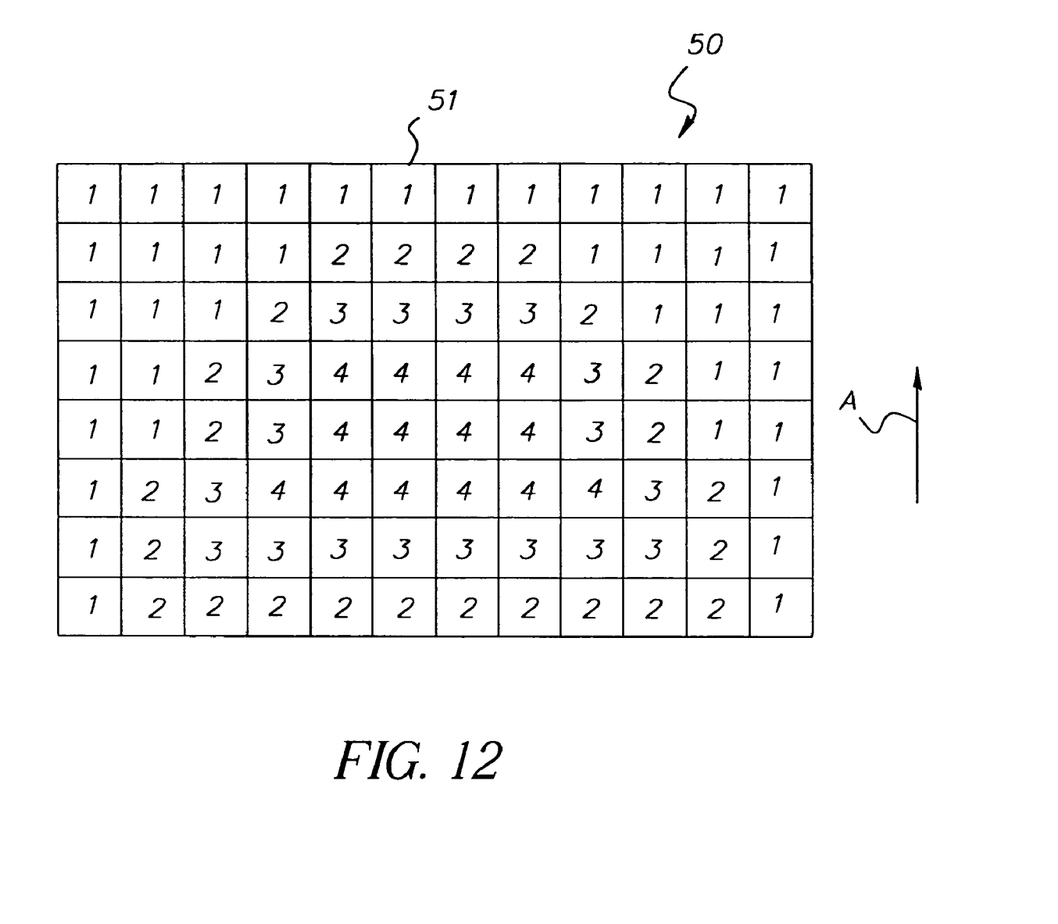
FIG. 12 is a diagram illustrating an example of position dependent weighting coefficients in an imaged screen set for a digital still camera according to a second or third embodiment of the present invention.

It should be noted that, when an imaged screen is vertically detected based on a detected result of a posture by the above-described posture detector or the luminance distribution in an imaged screen, position dependent weighting coefficients WP of respective steps may be established so as to have a maximum or minimum value at slightly below the center. FIG. 12 shows an example of such a position dependent weighting coefficients WP (direction indicated by an arrow A is the upper direction of the screen). Values of the position dependent weighting coefficients WP are shown in respective frames of blocks 51. The main subject photographed is generally likely to exist slightly below the center of a screen, and this can further improve accuracy of exposure adjustment for the main subject photographed.

It should be noted that the unneeded region excluding step S24 based on the luminance may also not be limited to the procedures described above. For example, when the luminance is higher than the preset threshold Tsk, and a region belonging to a contour in the bright side has the periphery thereof surrounded by a region of a contour in the dark side, a region of the contours can be recognized and excluded as a light source.

As described heretofore, according to the present invention, by performing exposure adjustment based on the luminance in a region which is remaining by estimating and excluding images other than the main subject photographed in an imaged screen, excellent advantages such as improvement in accuracy in exposure adjustment for to the main subject photographed, shortening of the time required in exposure adjustment, and the like can be achieved.

The invention has been described in detail with particular reference to certain preferred embodiments thereof, but it will be understood that variations and modifications can be effected within the spirit and scope of the invention.

Parts List

Figure 2:
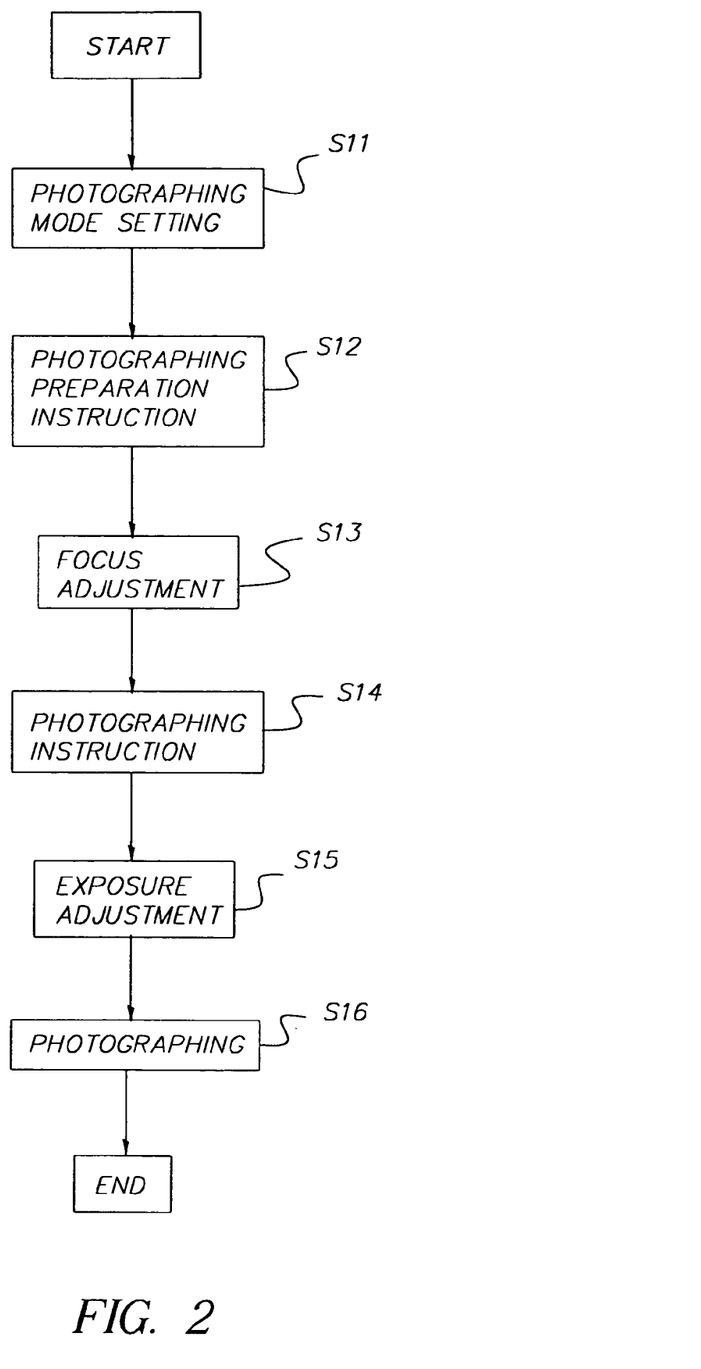
FIG. 2 is a flow chart illustrating a photographing procedure for a digital still camera according to the present invention.
Figure 3:
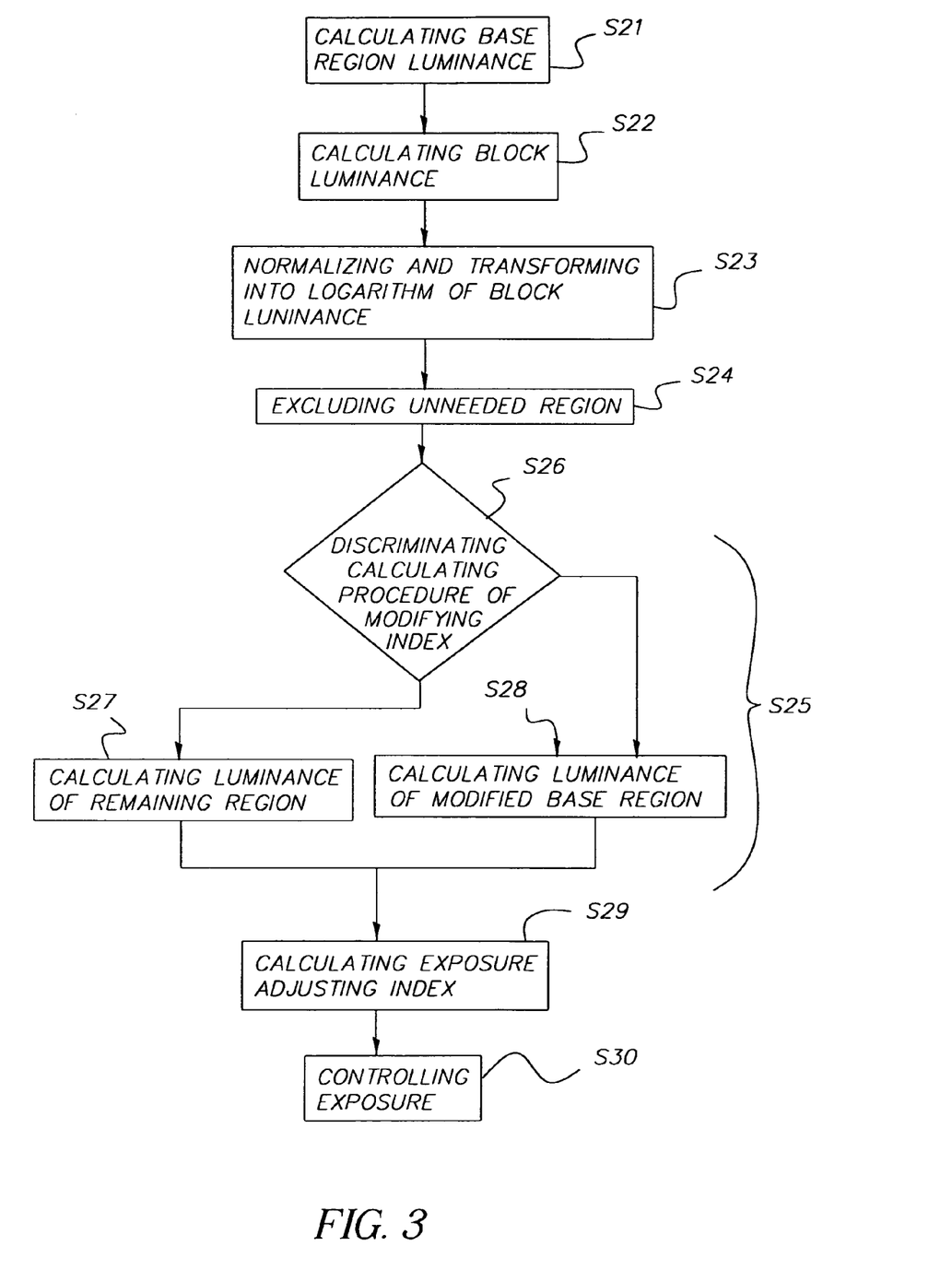
FIG. 3 is a flow chart illustrating an exposure adjusting step for a digital still camera according to a first embodiment of the present invention.

FIG. 1
22 Light emitting mechanism
24 Diaphragm mechanism
26 AF mechanism
16 Imaging unit driving circuit
21 Light emitting mechanism driving circuit
23 Diaphragm mechanism driving circuit
25 AF mechanism driving circuit
15 Display
11 Imaging unit
12 A/D converter
13 Operating unit
14 Memory
43 Posture detector
31 Photographing instructing unit
33 Photographing mode setting unit
41 Control signal interface
42 Image signal interface
32 Parameter setting unit FIG. 2
Start
S11 photographing mode setting
S12 photographing preparation instruction
S13 Focus adjustment
S14 Photographing instruction
S15 Exposure adjustment
S16 Photographing
End FIG. 3
S21 Calculating base region luminance
S22 Calculating block luminance
S23 Normalizing and transforming into logarithm of block luminance
S24 Excluding unneeded region
S26 Discriminating calculating procedure of modifying index
S27 Calculating luminance of remaining region
S28 Calculating luminance of modified base region
S29 Calculating exposure adjusting index
S30 Controlling exposure FIG. 8
S21 Calculating base region luminance
S22 Calculating block luminance
S23 Normalizing and transforming into logarithm of block luminance
S24 Excluding unneeded region
S41 Detecting vertical direction of screen Yes No
S42 Excluding unneeded region (2)
S26 iscriminating calculating procedure of modifying index
S27 Calculating remaining region luminance
S28 Calculating luminance of modified base region
S29 Calculating exposure adjusting index
S30 Controlling exposure FIG. 10
S21 Calculating base region luminance
S22 Calculating block luminance
S23 Normalizing and transforming into logarithm of block luminance
S43 Detecting image contour
S24 Excluding unneeded region
S41 Detecting vertical direction of screen Yes No
S42 Excluding unneeded region (2)
S26 Discriminating calculating procedure of modifying index
S27 Calculating remaining region luminance
S28 Calculating modified base region luminance
S29 Calculating exposure adjusting index
S30 Controlling exposure

What is claimed is:

1. A method for providing exposure adjustment in an imaging apparatus, comprising:
   a) capturing an image of a scene;
   b) partitioning the image into a predetermined number of blocks of image data values;
   c) determining, for each of the blocks of image data values, a difference between the image data value of the block and the image data value of a neighboring block to produce a plurality of difference values;
   d) identifying those blocks having a difference value greater than a predetermined threshold value as contour blocks;
   e) using the contour blocks to identify a subset of the predetermined number of blocks of image data values;
   f) determining a ratio of the number of blocks of image data values in the subset to the predetermined number of blocks of image data values;

g) using the ratio as an input to a predetermined function to provide a weighting coefficient;
h) calculating an exposure value using all of the predetermined number of blocks of image data values;
i) using the image data values in the subset of the predetermined number of blocks to produce an exposure adjustment value;
j) using the weighting coefficient to modify the exposure adjustment value; and
k) using the modified exposure adjustment value to adjust the exposure value.

2. The method of claim 1 wherein image data values are luminance values.

3. The method of claim 1 further comprising:
l) using the adjusted exposure value to capture a subsequent image of the scene.

4. The method of claim 1, wherein the predetermined function provides the same value weighting coefficient for all ratios that are greater than a threshold ratio value.

5. The method of claim 4, wherein the predetermined function provides a weighting coefficient value which linearly varies for all ratios that are less than a threshold ratio value.

* * * * *